Jan. 1, 1924
J. J. STAMPEN
CLAW FOR MILKING MACHINES
Filed Aug. 11, 1921
1,479,014
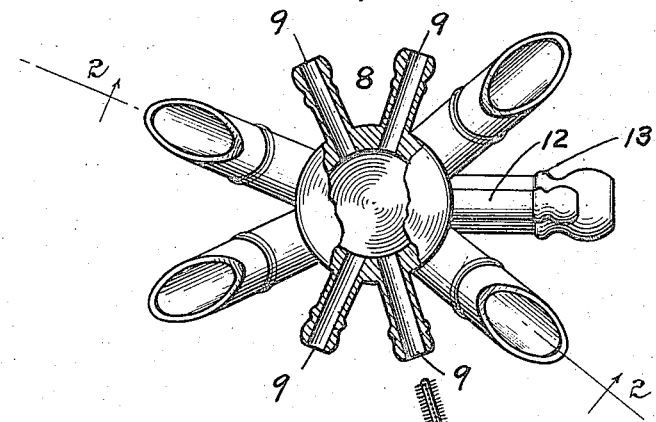
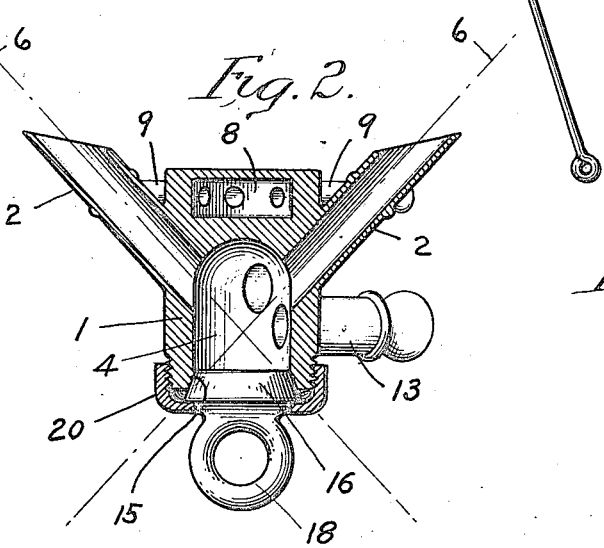
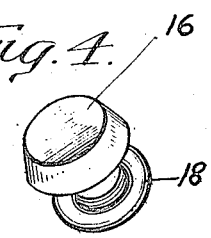
Inventor:
Jacob J. Stampen.
By Cheever & Cox Attys.

Patented Jan. 1, 1924.

1,479,014

UNITED STATES PATENT OFFICE.

JACOB J. STAMPEN, OF CHICAGO, ILLINOIS, ASSIGNOR TO PINE TREE MILKING MACHINE COMPANY, OF CHICAGO, ILLINOIS, A CORPORATION OF ILLINOIS.

CLAW FOR MILKING MACHINES.

Application filed August 11, 1921. Serial No. 491,334.

*To all whom it may concern:*

Be it known that I, JACOB J. STAMPEN, a citizen of the United States, residing at Chicago, in the county of Cook and State of Illinois, have invented a certain new and useful Improvement in Claws for Milking Machines, of which the following is a specification.

My invention relates to claws for milking machines and the general object of the invention is to obtain a claw that may be readily drained, will be efficiently liquid tight when closed, will avoid a tendency to become foul, and may be readily cleaned after use.

Another object of the invention is to provide advantageous means for hanging up the claw when not in use. Means must be provided by which the milk chamber within the claw body may be opened for drainage and cleaning purposes, and I utilize in a special way the drainage means also as means by which the claw may be safely suspended when not in use.

I obtain these objects by the construction illustrated in the accompanying drawings in which—

Figure 1 is a top plan view of the claw, a portion of the same being broken away to reveal the arrangement of the air tubes.

Figure 2 is a vertical section of the claw on the line 2—2, Figure 1.

Figure 3 is a perspective view of the screw cap for the bottom of the claw, and

Figure 4 is a perspective view of the drain plug.

Like numerals denote like parts throughout the several views.

The body 1 of the claw is cylindrical and provided with four milk tubes 2 extending obliquely upward from the central chamber 4. The claw body is open at the bottom and the milk tubes are so aligned that a brush 5 if inserted from the top downward, will, with little or no bending, pass the lower edge of the opposite side of the chamber. The position which the brush will take in such cases is indicated by the dot-and-dash lines 6 in Figure 2. At the upper end of the body is a separate air chamber 8 from which radiate four air tubes 9. In practice these tubes control the action of the pulsatory air leading to and from the teat cups in the manner well known in this art. As will be evident by reference to Figure 1, the air tubes 9 are arranged in pairs approximately diametrically opposite to each other and ordinarily a brush of the type shown in Figure 1 may pass in through one tube and to and through the tube on the opposite side of the air chamber. This facilitates cleansing.

A nipple 12 communicates with the air chamber 8 while a nipple 13 communicates with the milk chamber 4 for exhausting air therefrom.

At the bottom of the air chamber the claw body has an annular tapered seat 15 adapted to be closed by a conically tapered plug 16. This plug closely fits the seat and has a ring 18 by which the plug may be manipulated. The ring also forms means by which the claw may be hung up when not in use. The plug is held to its seat by means of a retaining ring 20 which engages the bottom of the plug and has an internal thread for fitting over and engaging an external thread formed on the outside of the claw body near the bottom, as shown in Figure 2. By preference the outer surface of the ring is knurled to facilitate manipulation. This construction at the bottom of the milk chamber has two advantages. In the first place it will be noted that the thread on the body is external and not internal. The result is that there is no opportunity for milk to accumulate in the thread. An internal thread would come into contact with the milk if an ordinary screw plug were employed, and obviously it is difficult to clean an internal thread in comparison with a smooth internal surface. In my construction when the ring is removed the milk on the inside of the chamber will not reach the external thread. Furthermore, even if the thread should become foul, there is no possibility of its coming into contact with the milk in the chamber when the claw is in use.

Another advantage of my construction is that the same ring 18 by which the plug may be handled affords means by which the claw may be suspended when not in use. As the plug is separate from the retaining ring 20, it is possible, if the parts are not screwed too tight, for the plug to rotate without rotating the retaining ring. The result is that if a slight rotation should be imparted to the plug when the claw is being attached upon a suspending hook, there will be no particular tendency to unscrew the retaining rig. In other words, if the suspending ring, retaining ring and plug all consisted of a single piece, such piece might readily become loosened as a result of repeated hangings and removals of the device upon and from a suspending hook. By having separate parts, however, this tendency is avoided, and the suspending ring 18 may be attached and detached to and from a suspending hook a number of times without any special tendency toward loosening the retaining ring.

Having thus described my invention what I claim as new and desire to secure by Letters Patent, is:

1. A claw for milking machines comprising a body with a central chamber open at the bottom, a plug seated in and closing the bottom of said chamber, a retaining ring for holding the plug to its seat, said ring having securing engagement solely with the exterior of the body, and operative connections for the claw carried exclusively by the body.

2. A claw for milking machines comprising a body with a central chamber open at the bottom, a plug seated in and closing the bottom of said chamber, a retaining ring for holding the plug to its seat, said ring having securing engagement solely with the exterior of the body, an extension on the plug passing through the ring and forming suspending means for the claw, and operative connections for the claw carried exclusively by the body.

3. A claw for milking machines comprising a body with a central chamber open at the bottom, said chamber having the lower end of its wall constituted by a smooth inwardly tapering portion, a plug having a surface corresponding to and seating against the smooth tapering wall of said chamber to close the latter, a retaining ring for holding the plug to its seat, said ring having securing engagement solely with the exterior of the body, and a plurality of milk tubes extending obliquely upward and outward from the body and communicating with the chamber within the body, the lower end of the body being as high as the produced axis of the tubes and said tapering wall portion being higher than the produced axis of the tubes to permit a straight cleaning brush inserted through the tubes to clear the lower edge of the body and effect cleaning of both the tubes and the inwardly tapering wall portion of the chamber.

4. A claw for milking machines having a body with two separate chambers, one for air and one for milk, and nipples radiating from the air chamber, the nipples being arranged in pairs approximately diametrically opposite to each other whereby a brush may be passed entirely through the body and into two opposite nipples for cleansing purposes.

In witness whereof, I have hereunto subscribed my name.

JACOB J. STAMPEN.